United States Patent [19]

Yamanaka

[11] Patent Number: 4,464,680
[45] Date of Patent: Aug. 7, 1984

[54] TELEVISION CAMERA HAVING AUTOMATIC FOCUSING DEVICE FOR ELECTRON BEAM OF PICKUP TUBE

[75] Inventor: Junichi Yamanaka, Sagamihara, Japan

[73] Assignee: Tokyo Shibaura Denki Kabushiki Kaisha, Kawasaki, Japan

[21] Appl. No.: 380,255

[22] Filed: May 20, 1982

[30] Foreign Application Priority Data

May 25, 1981 [JP] Japan ............................... 56-78976

[51] Int. Cl.³ .............................................. H04N 3/26
[52] U.S. Cl. .................................. 358/218; 315/5.34; 315/382.1
[58] Field of Search ...................... 358/218, 227, 217; 315/5.34, 31 R, 31 TV

[56] References Cited

U.S. PATENT DOCUMENTS

3,356,792 12/1967 Peters .................................. 358/218
3,710,018 1/1973 Ryley ................................... 358/218
4,325,082 4/1982 Griesshaber ......................... 358/218

Primary Examiner—Michael A. Masinick
Attorney, Agent, or Firm—Cushman, Darby & Cushman

[57] ABSTRACT

A focusing current or voltage applied to a focusing coil or focusing electrode to focus an electron beam on a target of a camera tube is modulated by a modulation signal so that the focusing current or voltage varies between a maximum value and a minimum value with its average value as the center. The focusing states of the electron beam at the maximum and minimum values of the modulated focusing current or voltage are detected by a video signal from the pickup tube. Based on this detection of focusing states of the electron beam, the average value of the modulated focusing current or voltage is corrected in such a way that the focusing states of the electron beam become equal to each other which correspond to the maximum and minimum values of the modulated focusing current or voltage. The correcting operation is carried out until the focusing states of the electron beam become equal at the maximum and minimum values, and the electron beam is then focused by the focusing current or voltage corresponding to the average value in the state.

7 Claims, 11 Drawing Figures

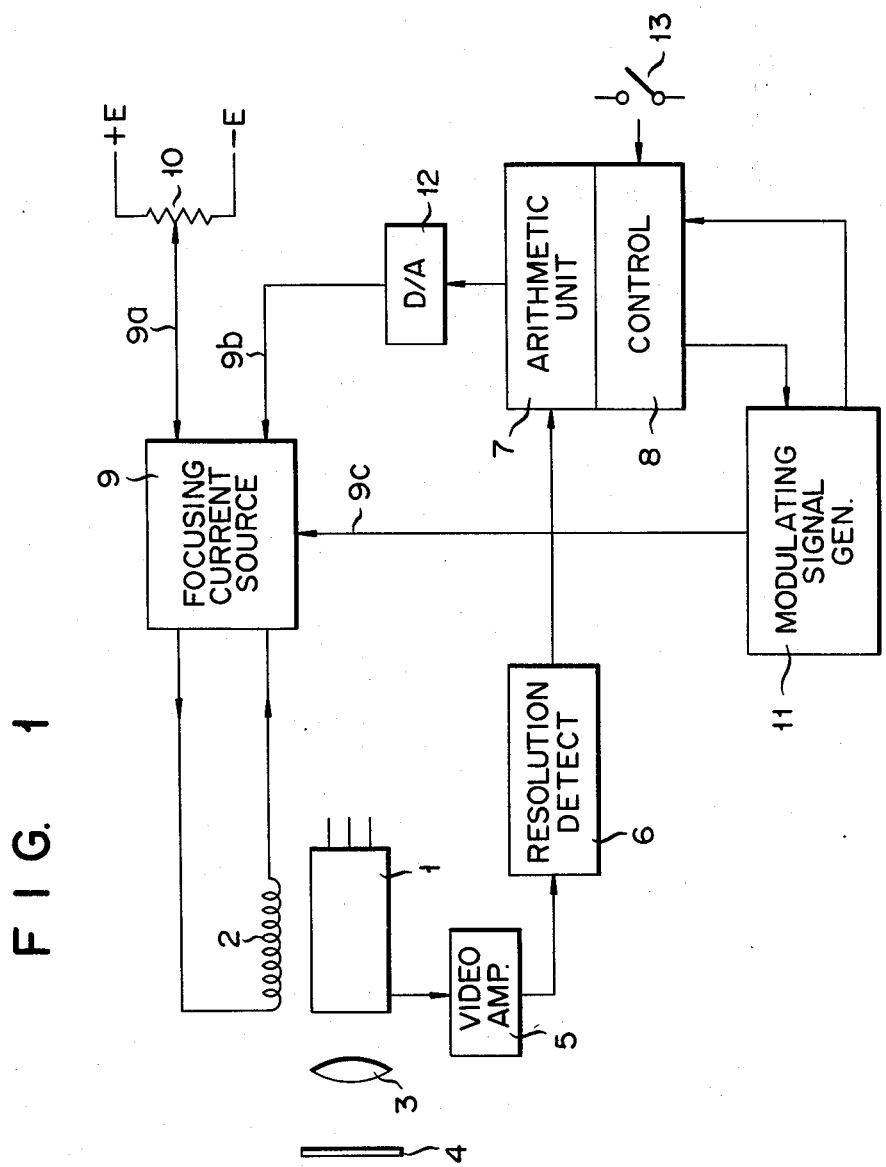
F I G. 1

TELEVISION CAMERA HAVING AUTOMATIC FOCUSING DEVICE FOR ELECTRON BEAM OF PICKUP TUBE

BACKGROUND OF THE INVENTION

The present invention relates to a television camera and, more particularly, to a television camera having an automatic focusing device for an electron beam of a pickup tube.

In general, for the purpose of focusing an electron beam in a pickup tube of a television camera a test chart called "resolution chart" or a registration chart is used. The registration chart is used to minimize the registration error of a color television camera, and has a chart depicted thereon which may be used in focus adjustment. The focus adjustment is achieved by visually observing with a monitor a video signal obtained by picking up the abovementioned chart and by regulating a focusing current flowing through a focusing coil in case of an electromagnetic focusing type pickup tube and a voltage of a focusing electrode in case of an electrostatic focusing type pickup tube. It is necessary to adjust an electron beam for each pickup tube in case of a color television camera using a plurality of pickup tubes. The above-described conventional electron beam focus adjusting method is feasibly affected by the skilfulness and subjectivity of a camera technician. Accordingly, uniform quality of a picture can hardly be obtained among the pickup tubes. Further, a plurality of television cameras are simultaneously used generally in a television broadcasting station. In order to equalize the picture equality or cameras, only sole camera technician adjusts a plurality of television cameras, and it accordingly takes a long time for the focus adjustment of electron beams.

SUMMARY OF THE INVENTION

It is an object of the present invention to provide an automatic focusing device for an electron beam of a pickup tube which is capable of automatically adjusting the focusing state of the electron beam on a target to the optimum state without resort to the skilfulness and subjectivity of a technician.

According to the present invention, supply means for supplying a focusing current or voltage to a focusing coil or electrode to focus an electron beam or a target in a pickup tube receives a modulation signal to modulate the focusing current or voltage so that it varies between the maximum value and the minimum value with its average value as a center.

The focusing state of the electron beam on the target at the maximum and minimum values of the modulated focusing current or voltage is detected by a resolution detecting circuit in accordance with a video signal from a pickup tube. Correcting means achieves a comparison between the magnitudes of the detection signals from the detecting circuit corresponding to the focusing states at the maximum and minimum values of the modulated focusing current or voltage, and supplies to the supply means a correction signal for varying the average value of the modulated focusing current or voltage in such a direction that the magnitudes of both the detection signals become equal to each other. The correcting operation is carried out until the magnitudes of both the signals from the detecting circuit become equal.

BRIEF DESCRIPTION OF THE DRAWINGS

FIG. 1 is a block diagram of a television camera having an automatic focusing device for an electron beam of a pickup tube according to one embodiment of the present invention;

DETAILED DESCRIPTION OF THE PREFERRED EMBODIMENTS

Figure 2:
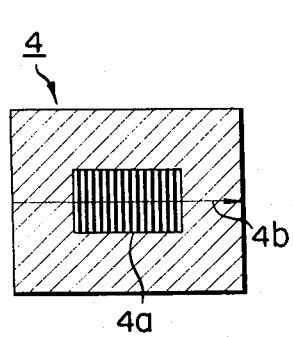
FIG. 2 shows an example of a resolution detection chart used for automatically focusing an electron beam.

In FIG. 1, reference numeral 1 generally designates a camera tube or an image pickup tube in which an electron beam is focused on a target by an electromagnetic field formed by a focusing current flowing through a focusing coil 2. For the purpose of focusing the electron beam, camera tube 1 picks up a focus adjusting chart 4 through a camera lens 3.

A chart video signal from pickup tube 1 is amplified by a video amplifier 5, and is then applied to a resolution signal detector circuit 6. Detector circuit 6 serves to detect a video signal corresponding to a resolution detecting portion (bar pattern) of chart 4 and to produce a resolution detection signal corresponding to a focusing state of the electron beam.

The resolution detection signal from detector circuit 6 is applied to an arithmetic unit 7 which is controlled by a controller 8 to thus produce a correction signal for focusing control. Arithmetic unit 7 and controller 8 may be composed of a microcomputer.

Focusing coil 2 is supplied with a focusing current from a focusing coil current source 9. An input 9a of current source 9 is connected to a potentiometer 10 connected across a DC power source so that the magnitude of the focusing current supplied to focusing coil 2 may be manually adjusted. An input 9c of focusing current source 9 is connected to a modulating signal generator 11. When an automatic focusing control of the electron beam is achieved, focusing current source 9 is supplied with a rectangular modulating voltage signal from generator 11 so that the focusing current is modulated. The arithmetic unit 7 is responsive to detection signals from detector 6 corresponding to the maximum and minimum values of the modulated focusing current to provide correction data so as to approach the present focusing state of the electron beam on the target to an optimum state. The correction data from arithmetic unit 7 is converted by a digital-to-analog (D/A) converter 12 into an analog signal, which is in turn applied to a control terminal 9b of focusing current source 9, thereby varying the magnitude of the focusing current determined by potentiometer 10. In this manner, the focusing current is corrected in such a direction that the magnitudes of the detection signals from detector 6 corresponding to the maximum and minimum values of the modulated focusing current become equal to each other. As described later, the optimum focusing state of the electron beam on the target can be obtained by the average value of the modulated focusing current in the state that the magnitudes of the detection signals from detector 6 at the maximum and minimum values of the modulated focusing current are equal to one another, namely by the unmodulated focusing current. When this optimum focusing state is obtained the modulation of the focusing current is stopped and the automatic focusing control of the electron beam is accordingly completed.

An automatic focusing command is applied to controller 8 by switch 13, thereby starting the automatic focusing operation. Upon reception of the automatic focusing command, controller 8 provides a modulating command to modulating signal generator 11 which supplies a rectangular modulating voltage signal to focusing current source 9. The modulating signal generator 11 supplies to controller 8 a signal for specifying a positive or negative half-cycle of the modulating signal, or a polarity discrimination signal of the rectangular modulating signal so as to discriminate between the detection signals from detector 6 corresponding to the maximum and minimum values of the modulated focusing current. The rectangular modulating signal preferably has a frequency of 30 Hz synchronized with a vertical synchronizing signal and a duty factor of 50%. Thus, the electron beam is focused by the maximum current of the modulated focusing current during one field, and by the minimum current of the modulated focusing current during the subsequent field.

Figure 3:
FIG. 3 is a waveform diagram of a video signal at the portion of an arrow in the chart of FIG. 2.

FIG. 2 shows one example of the resolution detecting chart 4. This chart 4 has, as shown, black-and-white bar pattern 4a at its center and a peripheral portion with an intermediate brightness between black and white. When this chart 4 is picked up by pickup tube 1, a video signal shown in FIG. 3 is taken from video amplifier 5 which is produced in one horizontal scanning period and corresponds to a central line 4b extending across bar pattern 4a from the left end to the right end of chart 4.

Figure 4:
FIG. 4 is a waveform diagram of a highpassed output of a video signal in FIG. 3.

The video signal from video amplifier 5 is applied to resolution detector 6. The detector 6 may be composed of a high-pass filter and a peak detector. The high-pass filter serves to produce a bar pattern signal, as shown in FIG. 4, which contains black and white signals representing bar pattern 4a. The amplitude (peak-to-peak) of the bar pattern signal depends upon the focusing state of the electron beam on the target in pickup tube 1. The signal shown in FIG. 4 is applied to the peak detector which produces a resolution detection signal having a magnitude proportional to the amplitude of the bar pattern signal.

Figure 5:
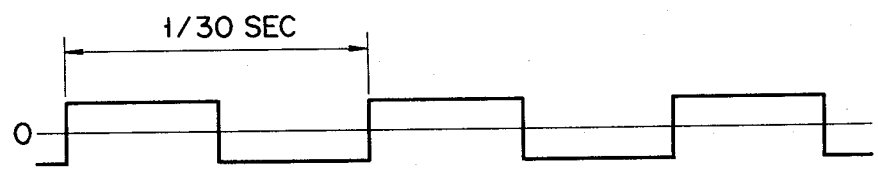
FIG. 5 is a waveform diagram of a modulation signal.
Figure 6:
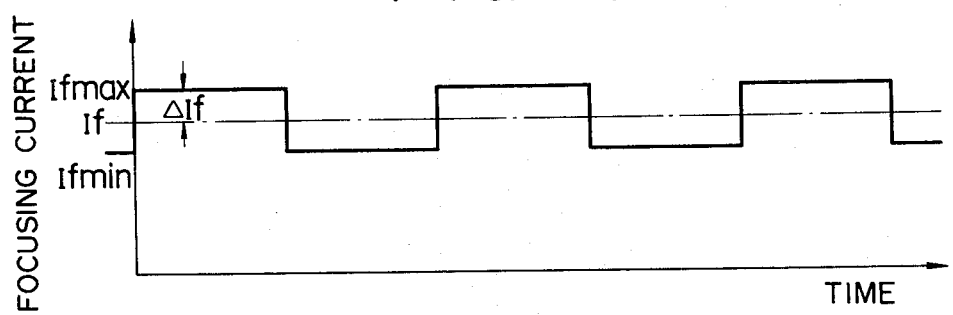
FIG. 6 is a waveform diagram of a modulated focusing current.

FIG. 5 shows a waveform of the modulating signal provided by modulating signal generator 11. The modulating signal is synchronized with vertical drive pulses and has a frequency of 30 Hz and a duty factor of 50%. The modulating signal is applied to current source 9 to modulate the focusing current. The waveform of the modulated focusing current is shown in FIG. 6. $I_f$ represents the magnitude of non-modulated focusing current, or the average of the modulated focusing current. There is a relationship of $$I_{fmax} - I_f = I_f - I_{fmin}$$

between the maximum value $I_{fmax}$ and the minimum value $I_{fmin}$ of modulated focusing current.

Figure 7:
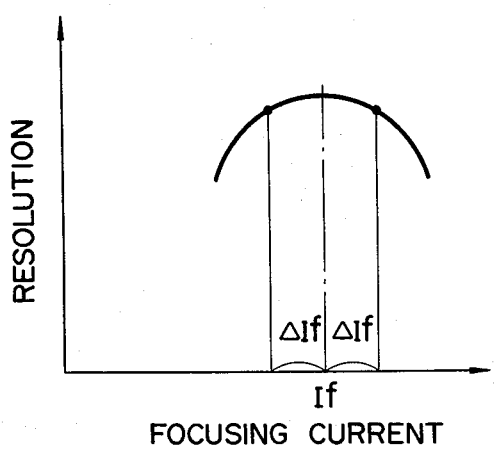
FIGS. 7 and 8 are a graphic representation of the relationship between resolution and focusing current for explaining the operation of the automatic focusing device according to the present invention.

The relationship between the focusing current $I_f$ and the resolution is shown in FIG. 7. The resolution becomes maximum at a predetermined value $I_f$ of the focusing current. As evident from the graph in FIG. 7, it is considered that the deteriorations in resolution resulting from increase and decrease in the amount $\Delta I_f$ of the predetermined focusing current $I_f$ are, if $\Delta I_f$ is small, substantially equal. The amount $\Delta I_f$ is preferably within 0.5% of the magnitude $I_f$ of the focusing current in case of current focusing and within 1.0% in case of voltage focusing.

When $I_f$ is an optimum value in the waveform shown in FIG. 6, the resolutions obtained at the maximum current value $I_{fmax}$ and the minimum current value $I_{fmin}$ are substantially equal, in case of $$I_f - I_{fmin} = I_{fmax} - I_f = \Delta I_f$$

Figure 8:
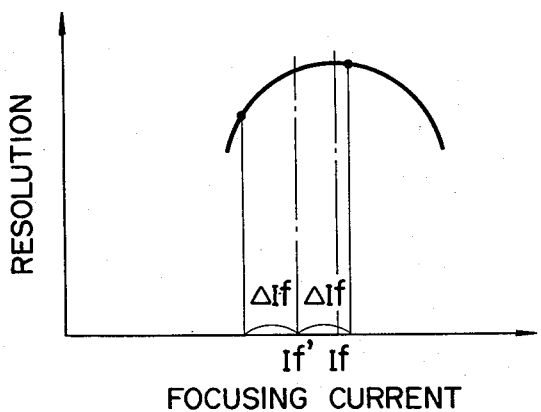

On the other hand, when the focusing current is $I_f'$ smaller than the optimum value $I_f$ and is modulated in the amount $\Delta I_f$, it is appreciated that the resolution at $I_f' + \Delta I_f$ is better than that at $I_f' - \Delta I_f$ as shown in FIG. 8. On the contrary, in case of $I_f' > I_f$, the resolution at $I_f' - \Delta I_f$ is better than that at $I_f' + \Delta I_f$. That is, arithmetic unit 7 can identify whether the present focusing current $I_f'$ is larger or smaller than the optimum focusing current $I_f$ in accordance with the magnitudes of the output signals of detector 6 corresponding to the maximum and minimum values of the modulated focusing current. The discrimination between the output signals of detector 6 corresponding to the maximum and minimum values of the modulated focusing current is achieved on the basis of the polarity discrimination signal of the modulating signal from modulating signal generator 11.

Arithmetic unit 7 provides correction data to focusing current source 9 to approach the present value $I_f'$ of the focusing current to the optimum value $I_f$. This correcting operation of the focusing current is continued until the magnitudes of the detection signals from detector 6 become equal to each other which are obtained during the positive and negative half cycles of the modulated focusing current.

Figure 9:
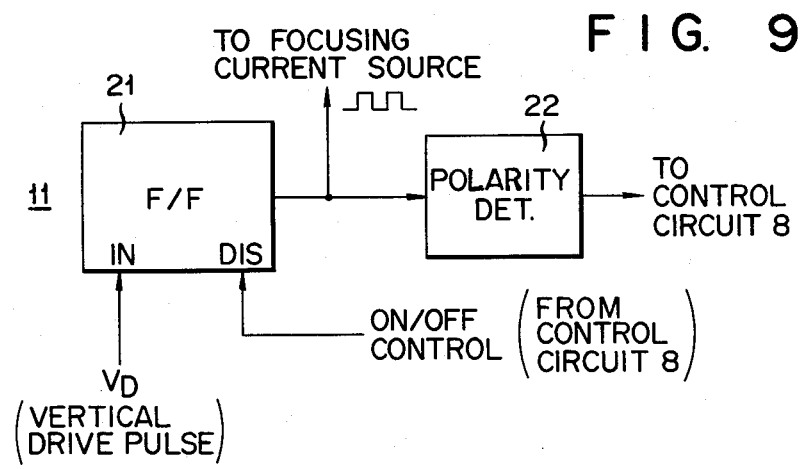
FIG. 9 is a block diagram of the modulation signal generating circuit 11 in FIG. 1.

FIG. 9 shows an embodiment of modulating signal generator 11. A flip-flop (F/F) 21 is provided which divides the frequency of vertical drive pulses $V_D$ of 60 Hz by a factor of two to produce the modulating signal of 30 Hz. Flip-flop 21 has its disable terminal connected to receive an ON/OFF control signal from control circuit 8 and stops, when disabled, its frequency dividing operation. The output signal of flip-flop 21 is applied to a polarity detector circuit 22 which detects the polarity of the modulating signal and feeds an output signal to control circuit 8 according to the detected polarity.

Figure 10:
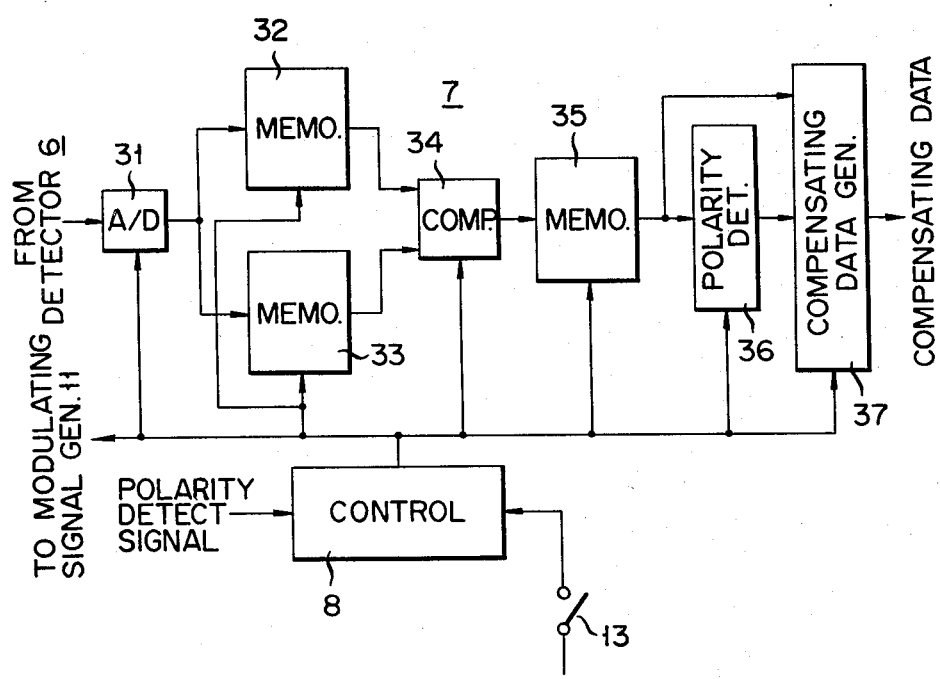
FIG. 10 is a block diagram of the arithmetic unit 7 in FIG. 1.

FIG. 10 is a schematic of arithmetic unit 7. The resolution detection signal from detector 6 is converted by an analog-to-digital (A/D) converter 31 into a digital signal. This digital signal is then stored in a first memory 32 during a positive half-cycle period of the modulating signal and in a second memory 33 during a negative half-cycle period of the modulating signal under the control of control circuit 8 responsive to the polarity detection signal. The digital signals from first and second memories 32 and 33 are applied to a subtracter or comparator 34, which provides a digital signal representing the difference between resolutions at the maximum and minimum focusing currents and a signal representing the sign of the digital signal. These signals are stored temporarily in a third memory 35. The signal representing the sign of the resolution difference, and read from third memory 35 is applied to a polarity detector 36, which produces an output signal representing that which of the resolutions at the maximum and minimum focusing currents is higher or that both the resolutions are equal. Then, the resolution difference signal read from memory 35 and the output signal of polarity detector 36 are applied to a compensating data generator 37 which provides compensating data for approaching the focusing current $I_f$ to the optimum focusing current $I_f$. The compensating data is applied to focusing current source 9. The compensating data generator 37 may comprise an ROM which stores a compensating data table. This ROM receives the output signals from memory 35 and detector 36 as an address signal so that compensating data is read out of the location designated by the address signal. Since the difference ($\Delta I_f$) between the maximum value $I_{fmax}$ and the average value $I_f$ of the modulated focusing current and the difference ($\Delta I_f$) between the minimum value $I_{fmin}$ and the average $I_f$ are desired to be small as described above, the compensating operation is repeated several times ordinarily until the optimum focusing state is obtained. When the optimum focusing state is obtained, the resolutions at the maximum and minimum focusing currents $I_{fmax}$ and $I_{fmin}$ become equal, which state is detected by polarity detector 36. In response to polarity detector 36, compensating data generator 37 will notify the completion of compensation of the focusing current to control circuit 8, which disables flip-flop 21 of modulating signal generator 11.

The respective circuits of arithmetic unit 7 shown in FIG. 10 are controlled in operation by control circuit 8. The operation is carried out in synchronism with a vertical synchronizing signal.

Figure 11:
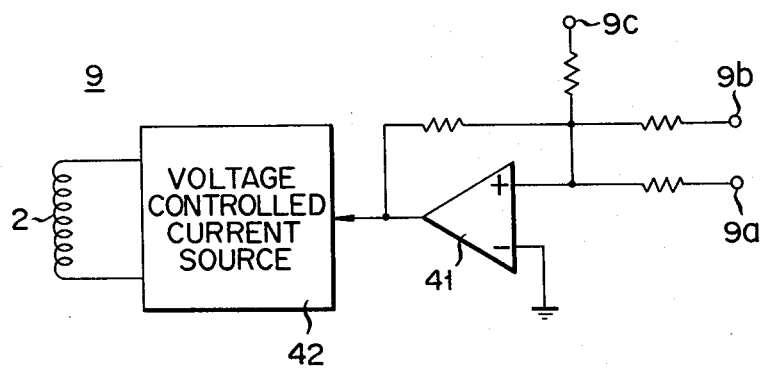
FIG. 11 is a circuit diagram of the focusing current source 9 in FIG. 1.

FIG. 11 shows an arrangement of focusing current source 9. The voltage applied to terminal 9a, the compensating signal applied to terminal 9b and the modulating signal applied to terminal 9c are added together by an operational amplifier 41. An output voltage of operational amplifier 41 controls a voltage-controlled current source 42.

The present invention has been described in connection with a pickup tube of electromagnetic focusing type, by way of example, but the present invention may also be applied to a pickup tube of electrostatic focusing type. In this case voltage applied to a focusing electrode may be compensated or corrected in the same manner as described above.

The above description of the present invention is based on the NTSC system. With the PAL or SECAM system, the frequency of a modulating signal may be determined in accordance with the frequency of its vertical synchronizing signal.

What is claimed is:

1. In a television camera having a device for automatically adjusting the focusing state of an electron beam on a target in a pickup tube, said automatic focus adjusting device comprising:
   focusing means responsive to focusing current or voltage for focusing the electron beam on said target;
   supply means for supplying the focusing current or voltage to said focusing means;
   said supply means being responsive to application of a modulating signal thereto to supply a modulated focusing current or voltage which varies between maximum and minimum values with its average value at the center;
   resolution detecting means connected to receive a video signal from said pickup tube for detecting resolutions depending on the focusing state of the electron beam on said target at the maximum and minimum values of the modulated focusing current or voltage; and
   compensating means responsive to said resolution detecting means for compensating the average value of the modulated focusing current or voltage so that the resolutions at the maximum and minimum values of the modulated focusing current or voltage become equal.

2. A device according to claim 1 wherein the difference between the average value and the maximum value of the modulated focusing current, and the difference between the average value and the minimum value thereof are equal to each other, and the difference is within 0.5% of the average value.

3. A device according to claim 1 wherein the difference between the average value and the maximum value of the modulated focusing voltage, and the difference between the average value and the minimum value thereof are equal to each other, and the difference is within 1.0% of the average value.

4. In a television camera having a device for automatically adjusting the focusing state of an electron beam on a target in a pickup tube, said automatic focusing device comprising:
   a modulating circuit for generating a modulating signal which varies between a maximum value and a minimum value;
   a focusing current source responsive to application of the modulating signal thereto for generating modulated focusing current varying between a maximum value and a minimum value with its average value as the center;
   a pickup tube having a focusing coil for focusing an electron beam on a target in response to the modulated focusing current;
   a resolution detector circuit connected to receive a video signal from said pickup tube for detecting resolutions depending on the focusing states of the electron beam corresponding to the maximum and minimum values of the modulated focusing current;
   an arithmetic circuit for comparing the resolutions and supplying compensating data corresponding to the difference between the resolutions; and
   means for compensating the average value of the modulated focusing current in response to the compensating data from said arithmetic circuit.

5. A device according to claim 4 wherein said arithmetic circuit comprises first and second memories for storing resolution data from said resolution detector circuit corresponding to the maximum and minimum values of the modulated focusing current; and supply means for supplying compensating data corresponding to the difference between the data from said first and second memories.

6. A device according to claim 1 or 4 wherein the modulating signal has half of the frequency of a vertical synchronizing signal and is synchronized therewith.

7. A device according to claim 1 or 4 further comprising a resolution detection chart having a black-and-white bar pattern to be picked up by said pickup tube for the automatic focusing of the electron beam.

* * * * *